United States Patent [19]

Rubio

[11] Patent Number: 4,905,584

[45] Date of Patent: Mar. 6, 1990

[54] PITTING-AND-STUFFING OLIVES, A DEVICE FOR WORKING IT AND THE PRODUCT OBTAINED THEREFROM

[75] Inventor: Joaquín G. Rubio, Sevilla, Spain

[73] Assignee: Sociedad de Racionalizacion Y Mecanizacion (Sadrym), Dos Hermanas, Spain

[21] Appl. No.: 283,235

[22] Filed: Dec. 12, 1988

Related U.S. Application Data

[62] Division of Ser. No. 31,800, Mar. 30, 1987, Pat. No. 4,847,101.

[51] Int. Cl.$^4$ ............................................. A23N 4/08
[52] U.S. Cl. ........................................ 99/494; 99/548; 99/561
[58] Field of Search ................. 99/494, 542, 546, 548, 99/544, 549, 555–557, 565, 559–561; 426/485, 484, 282

[56] References Cited

U.S. PATENT DOCUMENTS

| | | |
|---|---|---|
| 4,265,169 | 5/1981 | Silvestrini ..................... 99/555 X |
| 4,388,858 | 6/1983 | Margaroli et al. .................... 99/494 |
| 4,644,859 | 2/1987 | Rubio et al. ......................... 99/494 |
| 4,727,802 | 3/1988 | del ser Gonzalez ................. 99/494 |

*Primary Examiner*—Timothy F. Simone
*Attorney, Agent, or Firm*—Helfgott & Karas

[57] ABSTRACT

A device for pitting and pitting-and-stuffing olives includes two axially aligned punches for simultaneously cutting through an olive and of the end faces of which is fittingly supported in a seat formed in a cap positioned between the punches. One of the punches is hollow to provide access for a stuffing paste to be inserted into a pitted olive. Each punch has the same number of cutting fins of the same configuration. The cap has radial grooves coinciding in position with the cutting fins of each punch.

4 Claims, 9 Drawing Sheets

PITTING-AND-STUFFING OLIVES, A DEVICE FOR WORKING IT AND THE PRODUCT OBTAINED THEREFROM

This is a division of application Ser. No. 031,800, filed Mar. 30, 1987, U.S. Pat. No. 4,847,101.

OBJECT OF THE INVENTION

This invention refers to a new method for pitting olives different to known methods, either for direct consumption as pitted olives, or for subsequently stuffing with any product, or slicing them, the invention also being centered on a device for working this method, intended to form part of a pitting machine, and the invention likewise affecting the product obtained, specifically a pitted olive with completely different characteristics to those of olives pitted with conventional methods.

ANTECEDENTS OF THE INVENTION

As is known in the olive industry, and more specifically within the scope of the so-called table olive, there is great demand for this pitted fruit, both for consumption as such, without the stone, and stuffed with different products, such as anchovies, sweet pepper, etc., there also being a growing demand, although to a less extent for the moment, of olives which are sliced after having the stone removed.

Merely as an example, it can be said that in an annual campaign in Spain approximately 50 million kilos of olives are pitted, a figure which is doubled, i.e., which reaches 100 million kilos in the United States.

There are also other countries with high olive productions, such as Greece, Morocco, Turkey, Israel, Portugal, Algeria, Mexico, Argentina, etc., countries regarding which statistics are not available on the subject, but in which undoubtedly considerable quantities of pitted olives are produced for stuffing or otherwise, to be added to the above figures.

There is therefore an extremely important production of pitted olives, on an international level, either for marketing them direct as the said pitted fruit, or after stuffing them with any suitable product, or cut into slices.

For this purpose, pitting machines are used which generally work continuously and with very high production rates, exceeding 2,000 units per minute, being provided with means for retaining the olives individually and, after duly securing them, remove the stone.

Specifically, the pitting method known, after duly securing the fruit, consists of producing a cut in one of its polar areas, said cut having a diameter according to the size of the stone, and then attacks the olive by its opposite end with a pushing element which pulls the stone and the "little lid" formed in the aformentioned cut, out of the olive, in certain cases the little lid coming away from the stone and the said lid being used specifically in certain types of stuffed olives, to close the hole previously made, whereas in the vast majority of cases, this little lid constitutes waste which is reclaimed for obtaining oil, with very high depreciation of this part of the fruit, which as a result of the methods used, and as we have already said, becomes a by-product.

To work this method, known putting machines generally on a rotary drum, include a plurality of operative units or pitting devices, in each of which there is a little cap, like a dolly, on which the olive rests, which is attacked at one of its ends by a pitting punch, designed to pull out the stone and by the other end through an annular nozzle which crosses the cap by a drill with a bigger diameter than that of the nozzle, makes the cut forming the so-called "little lid", before the pitting punch which holds the olive during the said cutting operation makes its final forward movement, at the same time as the nozzle recedes to remove the stone.

Thus, according to the foregoing description, each olive which reaches the machine is held against the respective cap by the corresponding pitting punch; in this retained position, the nozzle attacks to cut the little cover and the said nozzle is again withdrawn, at the same time as the pitting punch advances, so that the stone can be ejected through the hole made in the olive by the oft-quoted cutting nozzle.

Once the nozzle-little cover-stone-end assembly of the pitting punch has passed the cap or dolly, two situations are produced, depending on the final product it is wished to obtain:

1. If it is only wished to obtain a pitted olive for marketing it direct in this way, cutting it subsequently into slices or stuffing it with some product without utilizing the "little lid", an element such as for example a sheet or rod is placed on the machine in the suitable place which, on knocking the stones, separates them with the "little lid" adherred thereto, falling into a separate collector to that designed to hold the pitted olives.

2. When it is wished to obtain certain types of stuffing, using the little lid, among other ways of utilizing it, we can quote one in which a fixed knife is provided on the machine in a suitable place, so that, taking advantage of one of te stages of the pitting process when the stone is gripped by the nozzle with the little lid inserted inside the latter, on passing through the point where the former is located, the little lid is separated from the stone, and it is then that a shank running inside the nozzle, after inserting the stuffing in the pitted olive, takes the little lid inside the olive, closing the outlet, in a combined movement of the shank and nozzle, while the stone, now without the little lid, falls into its respective collector.

According to the aforementioned method and device, in any case and as the final result, a pitted olive is obtained which always has a hole at one of its ends, whose diameter coincides basically with that of the stone which has been removed from it.

Well now, the aforementioned pitting method entails a serious problem. Specifically, the little lid accounts for up to 7% in weight of the olive pulp, although this varies according to the type of olive concerned. Although this pulp from the lid can be recovered, while the pitted olive, in keeping with current market prices, can be worth about 150 Pts/kg., the little lid, as a waste product, reaches a price of around 7 Pts/kg., i.e., a price which is practically twenty times less.

To conclude commenting on this method, due to the reduction in effective weight of the pitted olives, and to the low price of the little lids as waste material, which specifically in the case of annual production in the United States, involves 100 million kgs., losses of 750 million pesetas per campaign, data which, extrapolated to other olive producing countries, give a perfectly clear idea of the importance of this problem, derived from eliminating the little lid and recovering it as a low-priced byproduct.

On the other hand, when it concerns olives which have to be stuffed, after pitting a special consistency is required in the stuffing so that the "little lid" really serves as a cover and that the stuffing does not come out. If the stuffing material is not consistent enough, although the olive has its lid on, the stuffing can dissolve in the liquid used to conserve the fruit.

Logically, none of the machines existing in the market succeeds in placing the lid on a hundred per cent of the olives they process and, on the other hand, since the subsequent processes which the olives have to undergo after leaving the pitting machine until they reach the container involve a considerable amount of them coming away, with the corresponding effect of the stuffing coming out of the olives, said stuffing material and lids which can, in fact, be observed in any container of fruit stuffed by this method found on the market.

All the foregoing involves, on the one hand, a loss in weight of the final product with its respective economic repercussion, apart from the poor quality which the finished product offers.

DESCRIPTION OF THE INVENTION

The method for pitting olives which the invention proposes has been designed to overcome all the problems described until here in their different aspects, allowing the integral utilization of the olive pulp, preventing a lower-priced by-product being originated on account of pitting, as occurs with the conventional method, and also without the existence of holes which enable the stuffing to come out, in the case of the olives being suffed, as well as pitted.

Furthermore, this is achieved with a device which can be adapted to pitting or pitting-and-stuffing machines already known, obtaining a pitted or stuffed olive as the final result, which offers a completely different appearance to classic olives of this type, to be precise, which look the same as an olive with its stone.

To do so, to be more precise, the method for pitting olives which the invention proposes, consists of performing this operation by attacking the olive with two punches, at both its end areas, producing cuts in it which do not cause eliminating material, specifically cuts which, for example, emerge radially from two imaginary points coinciding with the ends of their likewise imaginary longer axis, later proceeding, after making these cuts, to pushing the stone axially, so that it is "torn away" from the pulp and ejected through "elastic deformation" of the said pulp, corresponding to the cuts of one of the ends of the olive, deformation which furthermore is only temporary, as once the stone has been removed, and alonside the retraction of the pusher, the deformed end of the olive is "closed" again, adopting its original configuration, i.e., that which it had when the stone was still inside it, and the cuts in one of its ends to push the stone, and the cuts made the other end to enable it to come out being both practically imperceptible at a glance.

In order to work this method, there has been provided a device intended to form part of known pitting or pitting-and-stuffing machines, in which the classic caps form a part, as a seat for the olives, although modified, and the likewise classic pitting punches, whereas the classic annular cutting nozzles to define the classic little lids are replaced by punches similar to the pitting punches, placed opposite the latter, and with the obvious purpose of making the necessary cuts in the olive to determine the temporary opening in it through which the stone is to be ejected by the pitting punches.

The aforementioned modifications regarding the cap do not affect it regarding the configuration within it of a bed or seat for the olive, only affecting the configuration of its hole for the nozzle and stone to pass; said hole, instead of being circular, according to classic nozzles, will now adopt the configuration of radial grooves which coincide dimensionally and position-wise with the fins with cutting edges with which the pitting and complementary punches are provided.

From this basic construction, it is even possible to dispense with the complementary punches, so that the "hole" in the olive for the stone to emerge is produced by the mere pressure of the pitting punch against the stone, and of this against the cap with the pulp placed between, a solution which is obviously more imperfect since the cutting lines of the olive are not foreseen.

Finally, in those cases in which the olive, apart from being pitted, has to be stuffed with a product, such as for example anchovy paste, sweet pepper or the like, it has been provided that the pitting punch or the punch which produces cuts in the outlet area of the stone, be hollow so that through it the desired stuffing operation can take place, immediately after the pitting stage, and in the same machine, which in this case, obviously, will be a pitting-and-stuffing machine.

As another feature of the invention, an olive is obtained which is well pitted, well pitted and stuffed, which offers an entirely novel appearance, specifically an outer surface, virtually continuous and closed, very similar to what it looked like before having the stone removed.

DESCRIPTION OF THE DRAWINGS

To complete the description being made and in order to assist a better understanding of the features of the invention, a set of drawings is attached to this Specification, as an integral part thereof, in which with an instructive and unrestricted nature, the following has been shown:

(a) On pitting by the known method.

Fig. 1 represents diagrammatically the situation in which the fruit and operating elements for pitting are to be found before the said pitting commences.

FIG. 2 represents the situation of the operation in which the stone has already been removed from the olive and is still held between the nozzle and the pitting punch.

FIG. 4 represents the moment when the nozzle releases the stone for it to drop into its respective collector.

FIG. 5 represents the fruit already pitted and free to fall by gravity into the fruit collector.

(b) On pitting and stuffing by the known method, placing the little lid.

Figure 6:
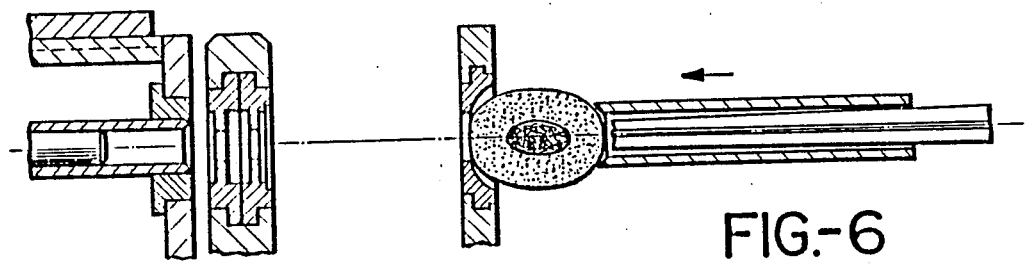

FIGS. 6 to 15 represent the operative stages of this process, in which the following is shown:

FIG. 6 represents the initial position of the fruit and operating elements before the pitting and stuffing cycle starts.

Figure 1:
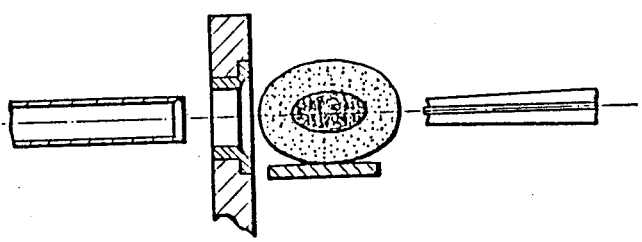
FIGS. 1, 2, 3, 4 and 5 represent the operative stages of the said process, showing the following.
Figure 2:
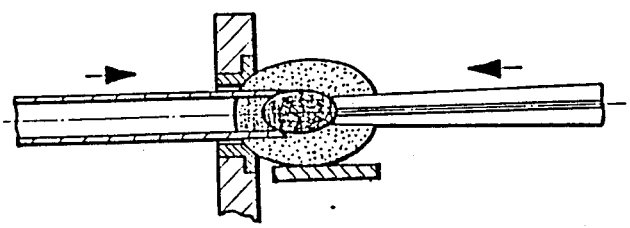
Figure 3:
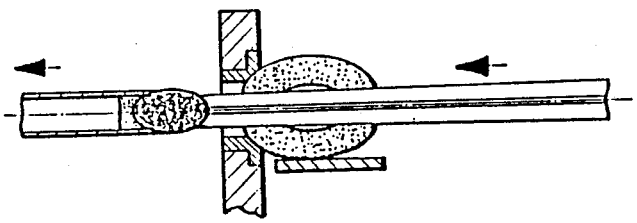
Figure 4:
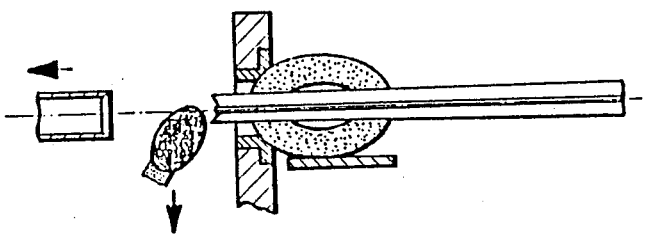
Figure 5:
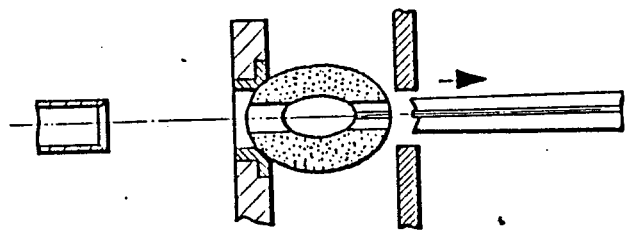
Figure 7:
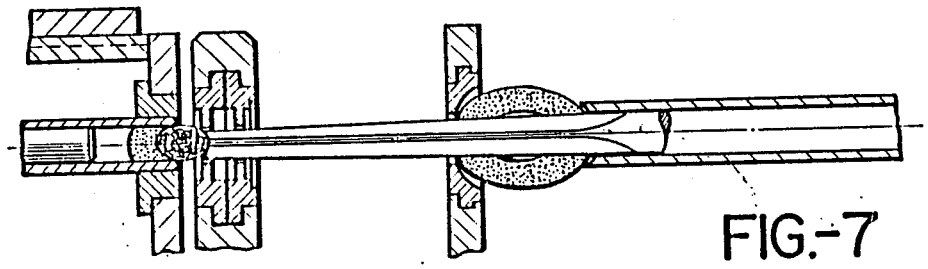

FIG. 7 represents the moment, after the sequences of FIGS. 2 and 3 described in section (a) above have been performed, the stone with its "little lid" are gripped between the pitting punch and the nozzle, visible with the complete little lid and part of the stone housed inside the latter.

Figure 8:
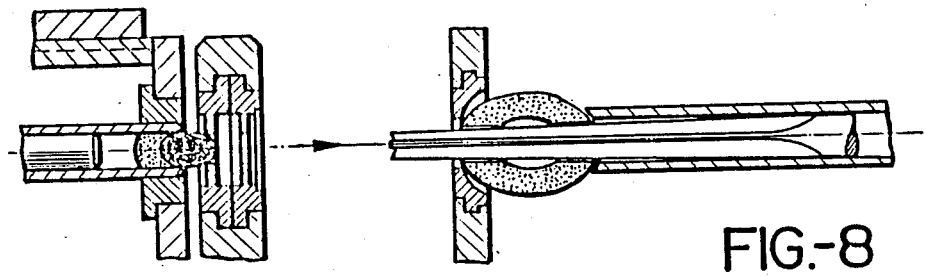

FIG. 8 represents the moment when the "little lid", stuck to the stone, remains inside the nozzle, as in the previous process, but now without making contact with the pitting punch.

Figure 9:
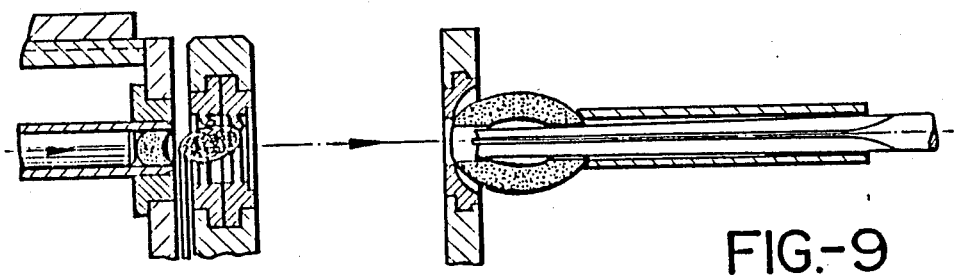

FIG. 9 represents the moment when the stone is separated from the little lid, it being clearly observed how the latter is still housed inside the nozzle, but has been separated from the stone.

Figure 10:
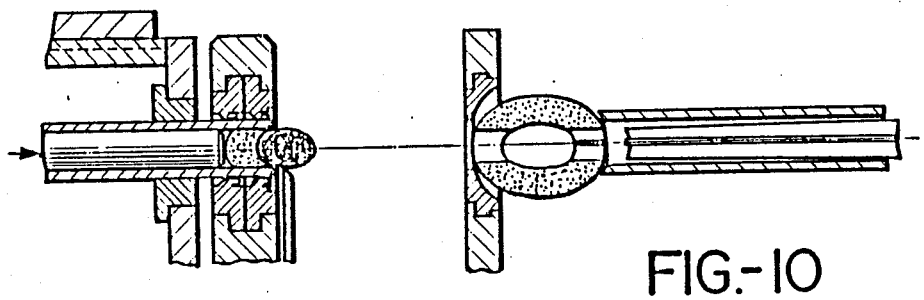

FIG. 10 represents the moment when the stone is forced to leave the axis of the nozzle so as not to upset the stuffing stage.

Figure 11:
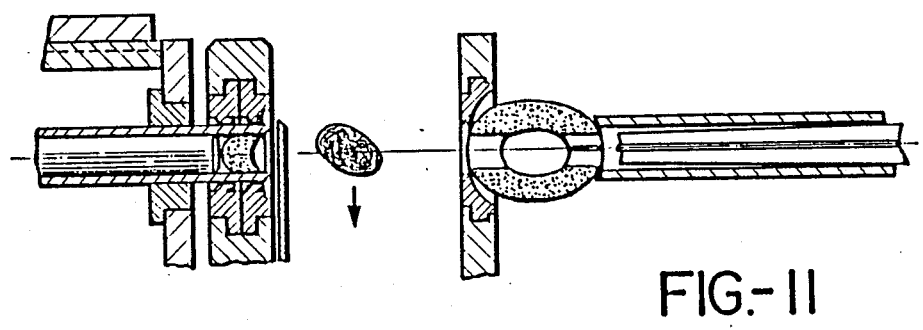

FIG. 11 shows the situation of all the operating elements and how the stone is released to fall by gravity into its corresponding collector.

Figure 12:
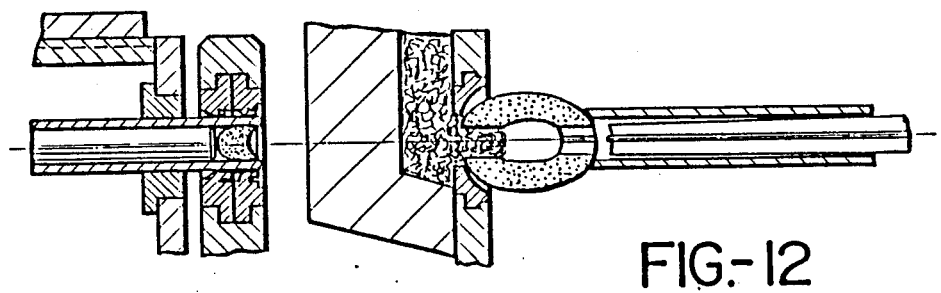

FIG. 12 shows diagrammatically the moment when the stuffing material is inserted in the mouth of the olive opened by the nozzle.

Figure 13:
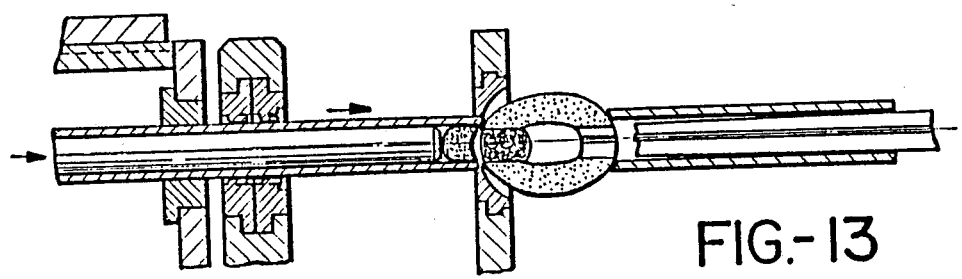

FIG. 13 represents the moment when the operating elements intervening make the little lid place itself over the opening which was left in the olive when the lid was removed.

Figure 14:
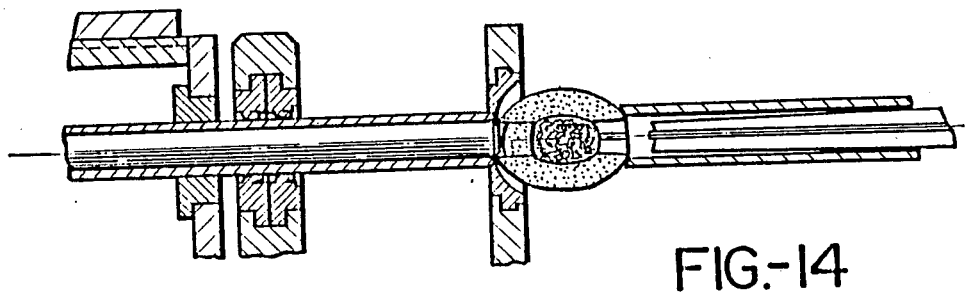

FIG. 14 represents the situation of the little lid and the stuffing once the operating elements have again intervened in the process.

Figure 15:
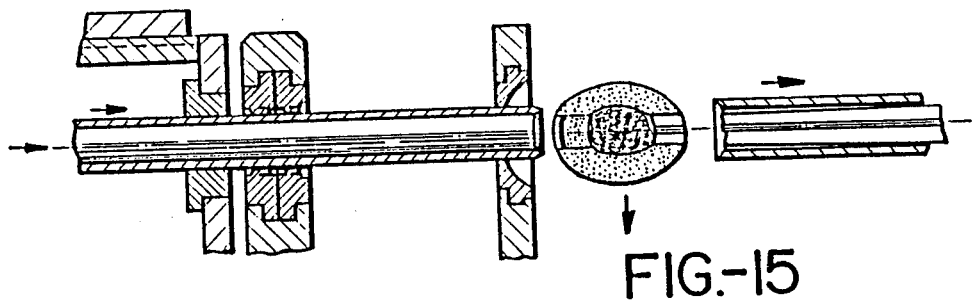

FIG. 15 represents what the stuffed fruit looks like after all the operations in the process have been completed, and also its suspended position without any element to prevent it falling by gravity into its respective collector.

All the figures described here are given in Patent of Invention number 537,820, owned by the applicant of this invention.

(c) On pitting with the method of the invention, whose patent is applied for.

FIGS. 16, 17, 18, 19 and 20 represent how pitting is performed by this method and what the final resultant product looks like.

Figure 16:
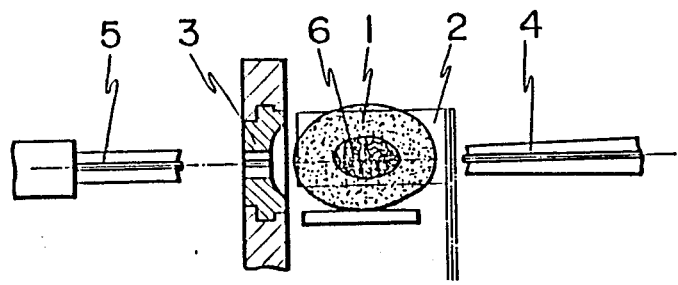

FIG. 16 represents the situation of both the fruit and the operating elements before starting the process.

Figure 17:
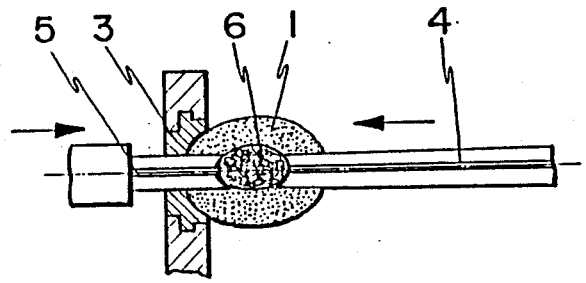

FIG. 17 represents the moment in which the dynamic operating elements have simultaneously pierced the olive, grasping the stone.

Figure 18:
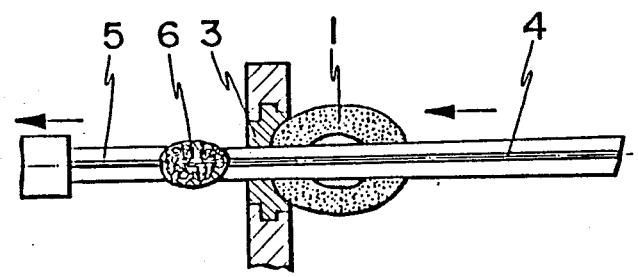

FIG. 18 represents the moment when the stone has been removed from the olive and consequently the latter has been left hollow.

Figure 19:
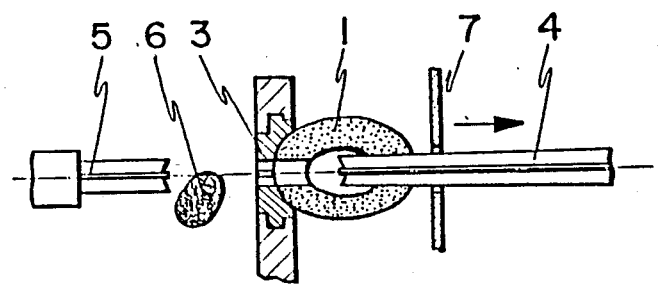

FIG. 19 represents the moment when the stone has been released, so that it can fall by gravity to the respective collector.

Figure 20:
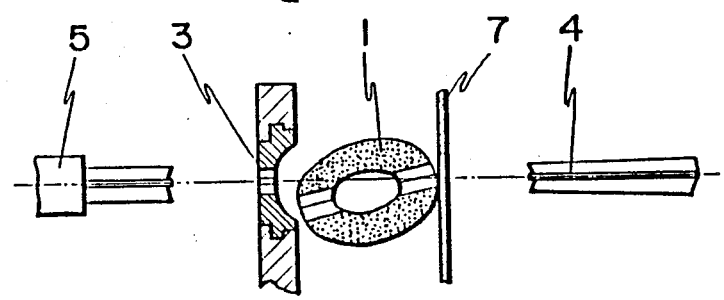

FIG. 20 represents the moment when the pitted olive is also released, likewise to be able to fall into its respective collector.

(d) On pitting and stuffing by the method whose patent of invention is applied for.

Figure 21:
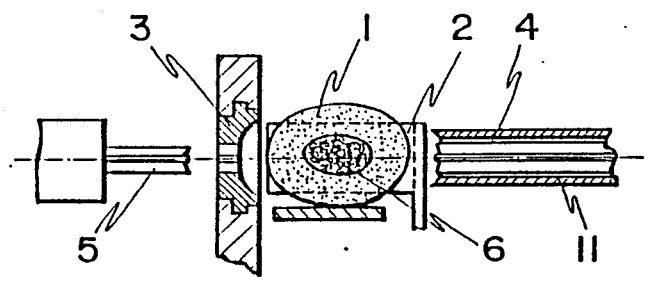

FIG. 21 represents the starting situation of the process, i.e., the moment when all the operating elements are arranged to remove the stone.

Figure 22:
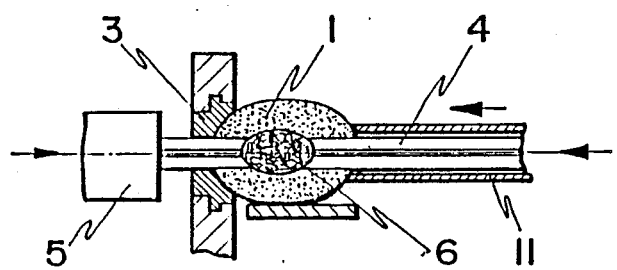

FIG. 22 represents the moment when the fruit is resting on the cap or dolly and the operating punches have pierced the olive, producing cuts until the stone is gripped between its ends.

Figure 23:
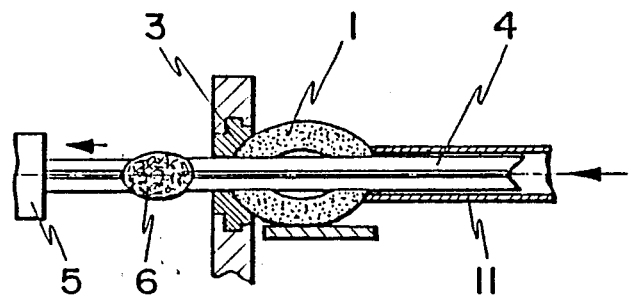
Figure 23:
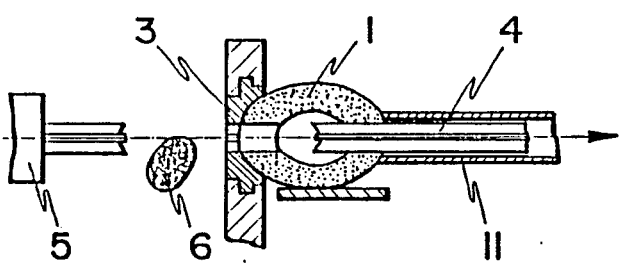

FIG. 23 represents the moment when, as in FIG. 18, the stone has been removed from the olive, leaving it hollow and ready to receive the stuffing material chosen.

FIG. 23' represents the moment when the stone has been released, so that it can fall by gravity into the respective collector.

Figure 24:
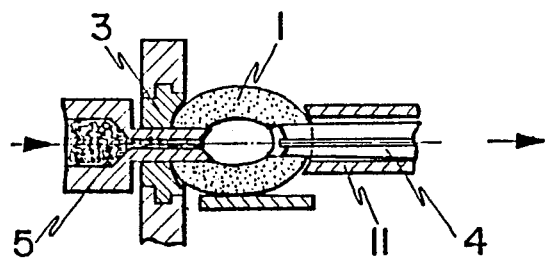

FIG. 24 represents the situation of both the fruit and the operating elements, for receiving the stuffing material, in the case that of the two alternatives considered in the specification, it is decided to insert the stuffing through the complementary punch.

Figure 25:
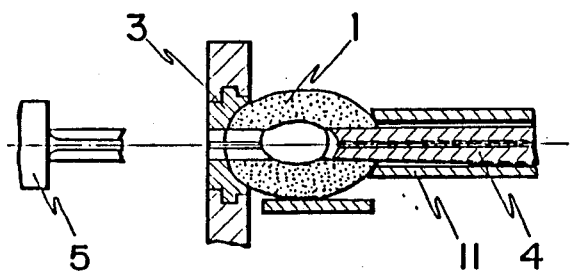

FIG. 25 represents the situation of both the fruit and the operating elements to be able to receive the stuffing material in the event that of the two alternatives considered in the specification, it is decided to insert the stuffing material through the pitting punch.

Figure 26:
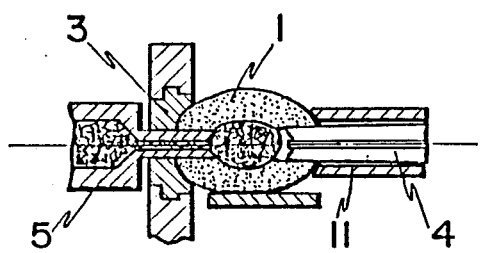

FIG. 26 represents the situation of the operating elements and fruit once the stuffing material has been inserted in the latter, according to the option shown in FIG. 24.

Figure 27:
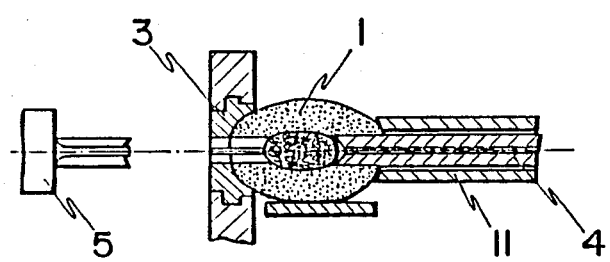

FIG. 27 represents the situation of the operating elements and fruit once the stuffing material has been inserted in it, according to the operation shown in FIG. 25.

Figure 28:
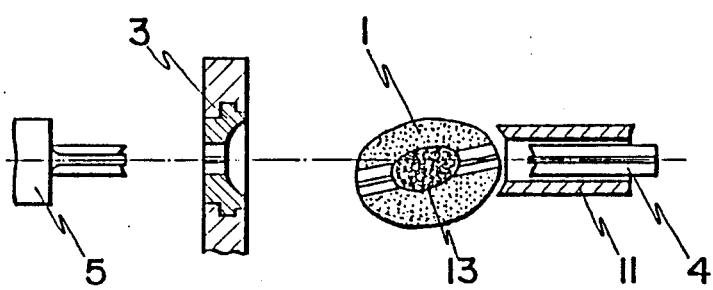

FIG. 28 represents the free situation of the olive to fall into its respective collector, once all the operating elements are no longer in contact with it.

(e) On the elements which characterize the invention whose patent is applied for.

Figure 29:
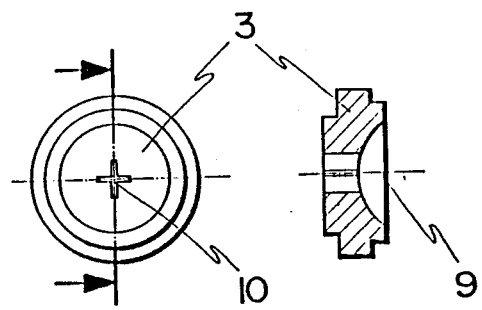

FIG. 29 represents the elevation and profile views in which the characteristics are illustrated of the cap or dolly which intervene to assist in the pitting process of this invention.

Figure 30:
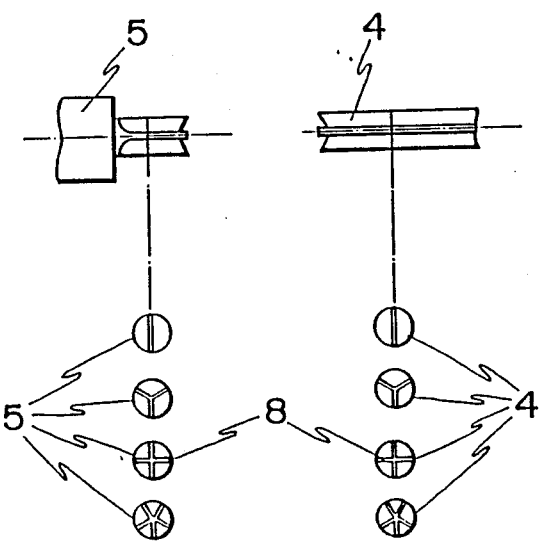

FIG. 30 represents several of the operations which can be chosen for the physical construction both of the pitting punch and of the complementary punch, always in the event of it only being wished to remove the stone.

Figure 31:
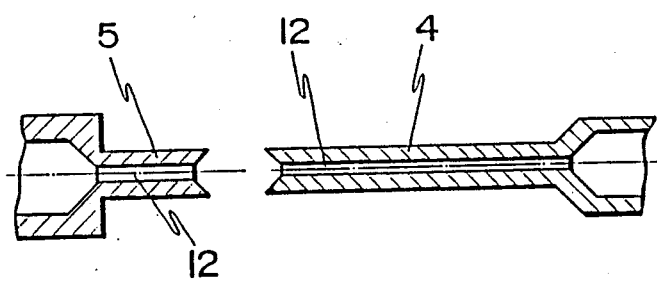

FIG. 31 shows only an embodiment variation both of the pitting punch and the complementary punch in the event that, as well as pitting, it is wished to stuff the olive immediately with a suitable paste of any suitable product.

(f) On the products obtained.

Figure 32:
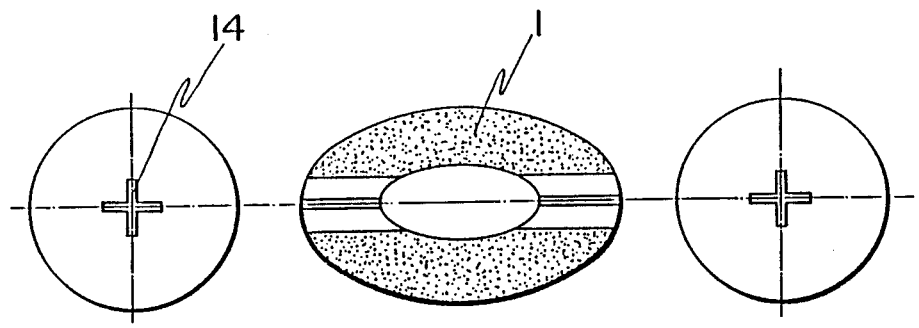

FIG. 32 represents a cross-section elevation of the pitted fruit obtained and its two side views, in the event that the option taken both regarding the pitting punch and the complementary punch is that of making them with four radial fins at 90°.

Figure 33:
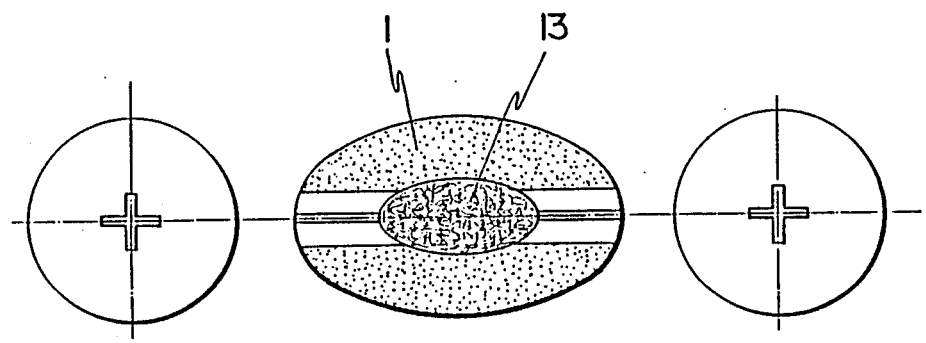

FIG. 33 represents a cross-section elevation view of the pitted and stuffed fruit obtained and its two side views, in the case that the option taken both for the pitting punch and the complementary punch is that of making them with four radial fins at 90°.

PREFERRED EMBODIMENT OF THE INVENTION

We shall not endeavour to describe in full detail what has been outlined briefly in sections (c), (d), (e) and (f).

Regarding the pitting method, which we have referred to in section (c), the following is specified:

In FIGS. 16, the olive 1, chain 2, cap or dolly 3, pitting punch 4, complementary punch 5, and the seed or stone of the olive 6, are represented. This situation of the elements materializes the moment in which each and all of them are at the start of the pitting process.

In a second operative stage, shown in FIG. 17, both the pitting punch 4 and the complementary punch 5, attack the olive simultaneously, the complementary punch 5 crossing the cap 3 and piercing the pulp 1 to one of the ends of the stone 6 of the olive, at the same time as the pitting punch 4 has also done so until it contacts the opposite end of the said stone.

From this moment, and according to the illustration in FIG. 18, the complementary punch 5 inverts its movement, retracting axially with the same linear speed as the punch 4 advances.

At the same time as the pitting punch 4 continues in its path making the stone come away from the pulp and ejecting it through the grooves 10 placed in the cap 3 but, and this is very important, without any material coming away from the olive other than that which constitutes its stone 6, until a limit situation in which the complementary punch is kept stationary and the pitting punch starts its retracting movement.

After the pitting punch 4 has started its retracting movement in the direction indicated by the arrow in FIG. 19, the stone 6 is released to fall by gravity into its respective collector.

Due to the friction effect of the punch 4 against the walls, produced in piercing the olive, the former usually drags it in its movement, so that it can be released and also fall by gravity into its collector, there being provided a perforated plate 7 with a groove wider than the diameter of the punch 4 and smaller than that of the olive 1, and of suitable length, according to the machine to which the elements resulting from the patent of invention are applied.

In this way, the said plate 7 will act to detach the fruit, releasing it and separating it from the punch 4, so that it can fall without difficulty into its respective collector.

According to this method, and in order to work it, the pitting device, adaptable to suitable pitting machines, maintains the classic pitting punch 4 and the modified cap 3, but replaces the classic annular nozzle by the complementary punch 5 which, like the nozzle quoted, is arranged in axial alignment and placed against the pitting punch 4.

As shown in turn in FIG. 30, these punches 4 and 5 can adopt numerous configurations, preferably maintaining the constant that in their operative ends and from a middle point coinciding with the imaginary axis of the punch, cutting fins 8 emerge radially which are to produce the necessary cuts in the olive 1 to allow the pitting punch 4 to reach inside it, and that from within it, the stone 6 is ejected, without fragmentations being produced, leading to waste pulp.

On the other hand, the cap 3 has a resilient structure and has a central concavity 9 which acts as a bed for one of the poles of the olive 1 to fit, there being foreseen within the bed some radial grooves 10 to allow the fins of the punches 4 and 5 to pass and also to allow the stone 6 of the olive to be pitted to pass.

The radial grooves 10 will be arranged in varying number, but coinciding with the fins of the punches 4 and 5, so that by its own elastic recovery, the cap forces the pulp of the olive to regain its original shape after the stone has left.

As explained above, it is feasible when working the method, for the device not to have the complementary punch 5, so that it is the actual pressure of the pitting punch 4 against the stone 6 which separates the stone from the olive, on pressing the said stone against the pulp and on the seat 9 of the cap 3.

In any event, according to the fundamental aim of the invention, a pitted olive is obtained which at the end of the process has all of its pulp, i.e., exclusively the stone has been removed, the said pulp being in one piece, although it has cuts which are hardly perceivable, for the stone to be pushed and ejected, hence the olive, as the final product, has an appearance which practically coincides with that of an olive with the stone, although it has been deprived of same, as can be seen in FIG. 32.

After disclosing sufficiently the pitting procedure by the method proposed in section (c), we now go on to describe the pitting and stuffing process, following the method invoked in section (d).

FIG. 21 represents the situation in which both the fruit and the operating elements are to be found before the process commences.

On this figure the following can be observed: the olive 1, the placing chain 2, the cap or dolly 3, the pitting punch 4, the complementary punch 5, the stone of the olive 6, and the gripping device 11 of the fruit 1.

FIG. 22 represents the immobilized olive and the punches inserted in the pulp, their attack ends contacting the opposite poles of the stone 6. The gripping device 11 is also in contact with the corresponding pole of the olive 1.

FIG. 23 represents the moment when the stone has been removed from the olive and consequently the latter is now hollow. The gripping device 11 continues to keep the olive 1 immobilized.

FIG. 23' represents the moment when the stone has been released so that it can fall by gravity into the respective collector.

Until here it has been described how pitting is performed, after which there are two options for executing the stuffing, which are both schematized in FIGS. 24 and 25.

The difference between both alternatives lies in that in the option in FIG. 24 it is the complementary punch 5 which is used to insert the stuffing material, until it reaches the hollow left by the stone in the olive, and in the option in FIG. 25, the situation is shown in the case in which the stuffing paste is inserted through the inside of the pitting punch 4.

Naturally, in both cases, the punches 4 and 5 have holes 12 through which the stuffing mass is injected into the hollow left by the stone of the olive.

It can be seen in FIG. 33 what the final product looks like, i.e., the stuffed olive, both in the case that it has been stuffed by punch 5 or punch 4.

Finally, FIG. 28 represents the moment when the gripping device 11 is separated from the fruit 1, releasing it so that it falls by gravity into the collector.

As can be seen in FIGS. 32 and 33, both the simply pitted olive 1 and the olive provided with an inner stuffing 13 maintains the whole of its original pulp and the observer can only see respective cuts 14 in its polar areas with a morphology similar to that of the pitting and complementary punches used, i.e., with an external surface whose grooves 14 are practically closed.

Finally, it should be stressed that as the pitted olive is perfectly closed throughout its contour, it is its actual pulp which acts as a container and integral fastening of its inner hollow, hence in the event that the said olive is stuffed, the classic risks of the said stuffing coming out are also eliminated.

It is not considered necessary to make this description any more extensive for an expert on the subject to understand the scope of the invention and the advantages derived therefrom.

The materials, shape, size and layout of the elements will be liable to variation, provided this does not involve altering the essense of the invention.

The terms in which this Specification has been described must always be taken in their fullest and not restrictive sense.

I claim:

1. A device for pitting and pitting-and-stuffing olives, comprising a stationary cap formed with a seat for supporting an end face of an olive being pitted, said seat having a configuration matching that of said end face to provide a bed for said olive; a first pitting punch which constitutes a first cutting element having cutting fins thereon; and a second complementary punch which constitutes a second cutting element and has the same cutting fins as said first cutting element, said first and second punches being positioned in an axial alignment with each other and opposite each other relative to the olive being pitted to simultaneously cut through said olive and eject a pit therefrom, said cap being positioned between said first and second punches, said cutting fins on each punch being the same in number and extending radially outwardly from an axis of the respective punch.

2. A device according to claim 1, wherein said cap includes a plurality of radially extending grooves, the number and position of which coincide with those of the cutting fins of said first and second punch so as to allow said cutting fins to pass through said grooves and said pit to be ejected from the olive.

3. A device according to claim 1, wherein at least one of said first and second punches is hollow to provide access for a stuffing paste into a pitted olive after a pit has been removed by said punches therefrom.

4. A device according to claim 2, wherein said seat is a substantially convex cavity formed in an end face of said cap.

* * * * *